US010393318B2

(12) United States Patent
Bernard (10) Patent No.: US 10,393,318 B2
(45) Date of Patent: Aug. 27, 2019

(54) DEVICE AND METHOD FOR PROVIDING PRESSURIZED FLUID (71) Applicant: L'Air Liquide, Société Anonyme pour l'Etude et l'Exploitation des Procédés Georges Claude, Paris (FR)

(72) Inventor: Philippe Bernard, Goincourt (FR)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 250 days.

(21) Appl. No.: 15/318,748

(22) PCT Filed: Jun. 16, 2015

(86) PCT No.: PCT/FR2015/051592
§ 371 (c)(1),
(2) Date: Dec. 14, 2016

(87) PCT Pub. No.: WO2015/197946
PCT Pub. Date: Dec. 30, 2015

(65) Prior Publication Data
US 2017/0122497 A1  May 4, 2017

(30) Foreign Application Priority Data
Jun. 25, 2014 (FR) ...................... 14 55870

(51) Int. Cl.
*F17C 13/04* (2006.01)
*F16K 27/12* (2006.01)
*G05B 15/02* (2006.01)

(52) U.S. Cl.
CPC .............. *F17C 13/04* (2013.01); *F16K 27/12* (2013.01); *G05B 15/02* (2013.01);
(Continued)

(58) Field of Classification Search
None
See application file for complete search history.

(56) References Cited

U.S. PATENT DOCUMENTS 5,070,900 A * 12/1991 Johnson .................. F16K 17/10
137/458
6,089,027 A *  7/2000 Wang ........................ F17C 1/00
62/46.1
(Continued)

FOREIGN PATENT DOCUMENTS

DE    199 11 032    9/2000
EP    2 249 327    11/2010
(Continued)

OTHER PUBLICATIONS

French Search Report and Written Opinion for corresponding FR 1455870, dated Feb. 20, 2015.
(Continued)

*Primary Examiner* — Michael Lebentritt
(74) *Attorney, Agent, or Firm* — Elwood L. Haynes (57) ABSTRACT The invention relates to a device for providing pressurized fluid. The device includes a first functional assembly including a pressurized fluid bottle having an opening having attached therein a first tap including an inner fluid circuit including an insulating valve. The device includes a second functional assembly forming a physical entity separate from the first assembly. The second assembly includes a second tap having an inner fluid circuit. The first tap and the second tap include respective coupling members forming a removable rapid connection system. The device includes in the first assembly at least one electronic data storage communication unit that is removably, wirelessly queryable via electromagnetic waves and in that the second assembly includes at least one electronic communication unit for removably, wire- (Continued)

lessly reading, via electromagnetic waves, data from the electronic member of the first assembly.

15 Claims, 3 Drawing Sheets

(52) U.S. Cl.
CPC .............. *F17C 2205/0165* (2013.01); *F17C 2205/0308* (2013.01); *F17C 2205/0326* (2013.01); *F17C 2205/0329* (2013.01); *F17C 2205/0338* (2013.01); *F17C 2205/0385* (2013.01); *F17C 2205/0394* (2013.01); *F17C 2205/057* (2013.01); *F17C 2205/058* (2013.01); *F17C 2250/034* (2013.01); *F17C 2250/043* (2013.01); *F17C 2250/077* (2013.01); *F17C 2265/00* (2013.01); *F17C 2265/04* (2013.01)

(56) References Cited

U.S. PATENT DOCUMENTS

| | | | | |
|---|---|---|---|---|
| 2007/0209715 A1* | 9/2007 | Burkhard | ............. | E21B 21/106 137/504 |
| 2008/0011057 A1* | 1/2008 | Spaolonzi | ............. | G01M 3/047 73/40 |
| 2008/0185326 A1* | 8/2008 | Serafin | ................ | B01D 29/908 210/186 |
| 2008/0190486 A1* | 8/2008 | Lazzara | ................ | F16K 17/04 137/78.5 |
| 2008/0308181 A1 | 12/2008 | Denis et al. | | |
| 2009/0260698 A1* | 10/2009 | Suter | ..................... | E21B 21/106 137/509 |
| 2012/0266980 A1* | 10/2012 | Olbrisch | ................ | E21B 34/10 137/515 |
| 2014/0195172 A1* | 7/2014 | Le | ........................... | G06F 17/00 702/47 |
| 2015/0308253 A1* | 10/2015 | Clark | .................... | E21B 33/085 175/24 |
| 2016/0131251 A1* | 5/2016 | Paisley | ................... | E21B 33/06 166/244.1 |
| 2016/0348468 A1* | 12/2016 | Blacklock | .............. | E21B 34/02 |
| 2017/0074091 A1* | 3/2017 | Jaffrey | ................. | E21B 33/064 |
| 2017/0102088 A1* | 4/2017 | Cheng | .................. | E21B 33/063 |

FOREIGN PATENT DOCUMENTS

| | | |
|---|---|---|
| FR | 2 745 531 | 9/1997 |
| FR | 2 756 360 | 5/1998 |
| FR | 2 840 385 | 12/2003 |
| FR | 2 892 799 | 5/2007 |
| FR | 2 970 313 | 7/2012 |
| FR | 2 979 687 | 3/2013 |
| FR | 2 998 641 | 5/2014 |
| JP | 51 65409 | 3/2013 |
| WO | WO 2009 039869 | 4/2009 |
| WO | WO 2013 041823 | 3/2013 |

OTHER PUBLICATIONS

International Search Report and Written Opinion for corresponding PCT/FR2015/051592, dated Nov. 18, 2015.

* cited by examiner

DEVICE AND METHOD FOR PROVIDING PRESSURIZED FLUID

CROSS REFERENCE TO RELATED APPLICATIONS

This application is a 371 of International PCT Application PCT/FR2015/051592, filed Jun. 16, 2015, which claims priority to French Patent Application No. 1455870, filed Jun. 25, 2014, the entire contents of which are incorporated herein by reference.

BACKGROUND

The present invention relates to a device for supplying pressurized fluid, to a corresponding valve and to a corresponding method of identification.

SUMMARY

The invention relates more particularly to a device for supplying a pressurized fluid, notably pressurized gas, comprising a first functional assembly comprising a cylinder of pressurized fluid equipped with an orifice in which a first valve is fixed, the first valve comprising an internal fluid circuit comprising an isolation shutter, the device comprising a second functional assembly forming a separate physical entity from the first assembly, the second assembly comprising a second valve equipped with an internal fluid circuit, the first valve and the second valve comprising respective attachment members forming a quick-connection system for removably connecting the second valve to the first valve.

The invention relates in particular to a device for distributing fluid, notably pressurized gas, of a modular type.

Examples of various modular fluid distribution devices are illustrated in documents FR2892799A1, FR2979687A1 or FR2970313A1.

Management of a holding of pressurized gas cylinders and associated accessories is often tricky both for the user and for the gas company manufacturing, marketing and managing these devices.

It is known practice for pressurized gas cylinders to be equipped with an identification device that allows their use or logistics to be rationalized (cf. for example EP2249327A1, JP5165409A2 or DE19911032A1).

The known solutions, although satisfactory, provide only an imperfect solution to the needs and evolutions of the ways in which these devices are used.

It is an object of the present invention to alleviate all or some of the disadvantages mentioned hereinabove of the prior art.

To this end, the device for supplying fluid according to the invention, in other respects in accordance with the generic definition thereof given in the above preamble, is essentially characterized in that the first assembly comprises at least one electronic data storage and communications member that can be interrogated remotely and wirelessly using electromagnetic waves, and in that the second assembly comprises at least one electronic data reading and communications member for reading, remotely, wirelessly and using electromagnetic waves, the data of the electronic member of the first assembly.

Moreover, embodiments of the invention may comprise one or more of the following features:

the electronic communications members of the first and second assemblies use wireless communications technology of the same kind having a determined maximum range, said maximum range being greater than or equal to the distance separating said members when the second valve is in the connected position on the first valve, the electronic communications members of the first and second assemblies are configured to communicate wirelessly using at least one of the following technologies: radio frequency identification (RFID), near field communication (NFC), at least one of the electronic communications members of the first and second assemblies is configured to have a wireless communications range of between 1 and 5 millimeters and 40 centimeters, preferably between 1 centimeter and 10 centimeters, said at least one electronic communications member of the first assembly is arranged on or around the first valve, the first assembly comprises a protective bonnet protecting the first valve, the bonnet being fixed to the cylinder and/or to the first valve, said at least one electronic communications member of the first assembly being secured to the bonnet, said at least one electronic communications member of the second assembly is incorporated into or fixed to the second valve, said at least one electronic communications member of the second assembly is incorporated into a functional member physically separate from the second valve and fixed removably to the second valve, said at least one electronic communications member of the first assembly comprises at least one of the following: a passive transponder with no device for generating electromagnetic waves, an active transponder comprising a device for generating electromagnetic waves, the transponder comprising an electronic read-only memory or an electronic read and (re)write memory, with or without a battery, and in that said at least one reading member (10) of the second assembly comprises at least one of the following: a passive transponder with no device for generating electromagnetic waves, an active transponder comprising a device for generating electromagnetic waves, the transponder comprising an electronic read-only memory or an electronic read and (re)write memory, with or without a battery, the second assembly comprises a remote data transmission member comprising data acquisition and processing logic electronics and a data emission antenna emitting data in the form of electromagnetic radio waves, said logic electronics being connected to or incorporated into the reading member of the second assembly and configured to receive data coming from the reading member of the second assembly and to transmit these data remotely, the remote transmission member is incorporated into the second valve or into a distinct module connected removably to said second valve, said at least one electronic communications member of the first assembly is configured to store at least one of the following pieces of information: an identification of the cylinder, information relating to the nature of the fluid contained in the cylinder, information relating to the maximum capacity of the cylinder, information relating to the amount of fluid contained in the cylinder, information identifying the owner or user of the cylinder, information relating to the site at which the cylinder is used, information relating to the expiry date of the fluid contained in the cylinder, information relating to certification of the fluid contained in the cylinder, a history of at least one of the previous pieces of information, said at least one electronic communications member of the first assembly is fixed to the cylinder, out of: the first assembly and the second assembly, at least one comprises an electronic data acquisition and processing member, said electronic data acquisition and processing member being connected wirelessly or through a wired connection to the electronic communications member of the first assembly or to the communications member of the second assembly, the electronic data acquisition and processing member being configured to detect a connected or disconnected status of the second valve with respect to the first valve according to the status of the wireless communications connection between the electronic communications member of the first assembly and the electronic communications member of the second assembly, the electronic data acquisition and processing member is configured to detect a connected or disconnected status of the second valve with respect to the first valve according to whether the electronic communications member of the second assembly receives or, respectively, does not receive, data from the electronic member which have been emitted by the electronic communications member of the first assembly via a signal of determined signal strength, the electronic data acquisition and processing member is configured, in the event of detection of a transition from a disconnected status to a connected status of the second valve with respect to the first valve, to send and/or to display determined information relating to the connected/disconnected status of the second valve with respect to the first valve, the electronic data acquisition and processing member is configured, in the event of detection of the transition from a connected status to a disconnected status of the second valve with respect to the first valve, to send and/or display determined information relating to the connected/disconnected status of the second valve with respect to the first valve, the electronic data acquisition and processing member is configured, in the event of detection of the transition from a disconnected status to a connected status of the second valve with respect to the first valve (or vice versa), to command at least one of the following: to command the display or transmission of information relating to the gas supply device, to start/stop running a program controlling at least one functional member of the gas supply device.

The invention also relates to a valve for transferring pressurized fluid for a device for supplying pressurized fluid according to any one of the features above or below, comprising a body housing an internal fluid circuit, male and respectively female quick connection/disconnection removable attachment members intended to collaborate respectively with mating female/male attachment members belonging to a storage valve secured to a pressurized-fluid cylinder of a first assembly, said transfer valve comprising a mobile actuating member for actuating the shutter of the storage valve in order to cause same to open or close, said transfer valve comprising at least one electronic data reading member operating remotely, wirelessly and with electromagnetic waves and configured to exchange data with a mating electronic data storage member that can be interrogated remotely and wirelessly using electromagnetic waves and that belongs to a storage valve.

The invention also relates to a method for identifying a first functional assembly of a device for supplying pressurized fluid according to any one of the features above or below, the method comprising a first step of connecting a second valve of a second functional assembly to the first valve of the first functional assembly, a step of wirelessly reading at least one piece of data contained in the electronic communications member of the first by the electronic communications member of the second assembly.

According to other features, the method comprises at least one of the following: a step of memory storage of said information read in the electronic reading member, a step of remotely transmitting the information read.

The invention may also relate to any alternative device or method comprising any combination of the features above or below.

BRIEF DESCRIPTION OF THE DRAWINGS

Other specifics and advantages will become apparent from reading the description hereinafter, given with reference to the figures in which.

DESCRIPTION OF PREFERRED EMBODIMENTS

Figure 1:
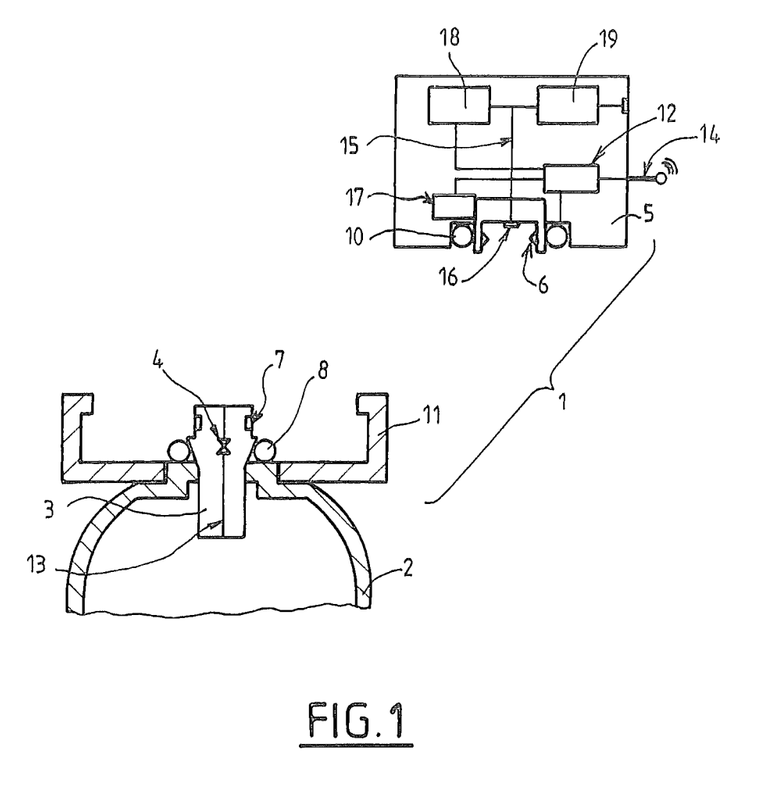
FIG. 1 depicts a schematic and partial cross-sectional view illustrating a first exemplary embodiment of a fluid supply device in a disconnected state.

FIG. 1 schematically depicts a device for supplying pressurized fluid, notably pressurized gas. The device 1 comprises a first functional assembly 2, 3, 11 comprising a pressurized fluid cylinder 2 equipped with an orifice in which a fluidic coupling or port hereinafter referred to as "first valve" is fixed.

In particular, this first valve 3 may be a simple filling and/or withdrawing port equipped with a self-closing shutter (opened by mechanical actuation and/or as a result of a gas pressure). Of course, as an alternative, this first valve could be a more elaborate valve, notably equipped with an isolation shutter operated by a manual and/or electrical and/or pneumatic control member.

The first valve 3 is for example screwed into a tapped orifice of the cylinder 2. What that means to say is that the first valve 3 is secured (fixed) to the cylinder 2 and is not intended to be removed in the use configuration.

The first valve 3 conventionally comprises an internal fluid circuit 13 connected to the internal volume of the cylinder 2. The circuit comprises at least one isolation shutter 4. Of course, the first valve 3 may comprise any other functional component that is commonplace for a valve.

The device 1 comprises a second functional assembly forming a physical entity that is distinct from the first assembly 2, 3, 11. As illustrated, the second assembly comprises a second valve 5 likewise provided with an internal fluid circuit 15. In the same way as with the first valve, the internal circuit 15 of the second valve 5 may comprise at least one isolation shutter and/or a pressure regulator and/or a flow regulator and/or any other functional component suitable for a valve.

Figure 2:
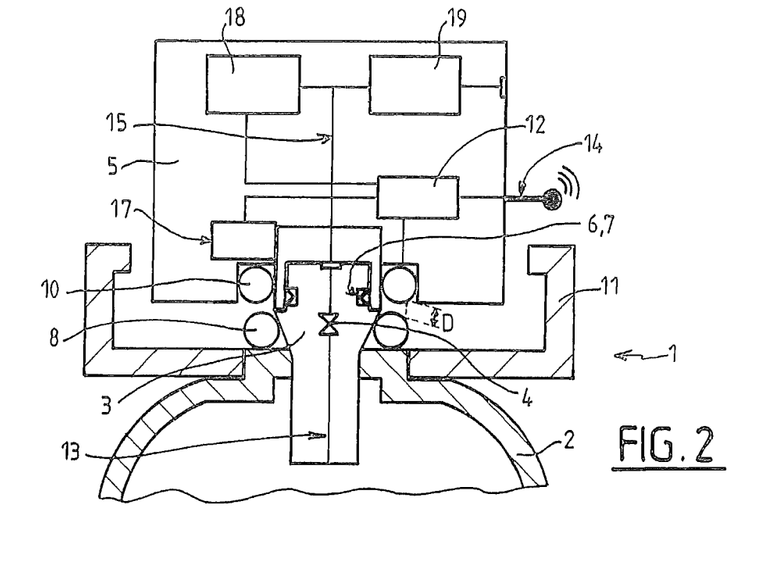
FIG. 2 depicts a schematic and partial cross-sectional view of the fluid supply device of FIG. 1 in a connected state.

The first valve 3 and the second valve 5 each comprise respective attachment members 6, 7 that form a quick connection system for removably connecting the second valve 5 to the first valve 3 (cf. FIG. 2, connected position). For example, the quick connection system may comprise a system involving balls collaborating with ribs, catching claws collaborating with mating housings, a system of bayonets and corresponding grooves.

The quick connection system 6, 7 is, for example, of the male/female type and allows the second valve 5 to be attached mechanically to the first valve 3 in a disconnectable manner. This locking system may comprise a manual actuating member, possibly comprising a mobile locking member that requires the user to effect one or more manual actions.

When the second valve 5 is connected to the first valve 3, the ends of the fluid circuits 13, 15 of the two valves 3, 5 are placed in sealed communication with one another and the flow of fluid between these two circuits 13, 15 may be permitted or not according to whether the valve or valves of the circuit or circuits 13, 15 are open or closed.

To this end, the internal circuit 15 of the second valve 5 may comprise a pressure sensor 18 in the circuit 15, in order notably to measure the pressure in the cylinder 2 when the circuit 15 of the second valve is placed in fluidic communication with the inside of the cylinder 2 via the first valve 3.

According to one advantageous feature, the first assembly comprises at least one electronic data storage member 8 that can be interrogated remotely and wirelessly using electromagnetic waves and the second assembly comprises at least one electronic member 10 for remotely and wirelessly using electromagnetic waves reading data from the electronic member 8 of the first one. What that means to say is that the first and second assemblies comprise electronic communications members 8, 10 communicating wirelessly to exchange information between these two assembled and separable entities.

The electronic communications members 8, 10 preferably use wireless communications technology of the same type having a determined maximum range. The maximum range for communication is notably greater than or equal to the distance D separating said electronic members 8, 10 when the second valve 5 is in the connected position on the first valve 3 (cf. FIG. 2).

The electronic communications members 8, 10 of the first and second assemblies may notably be configured to communicate wirelessly using at least one of the following technologies: radio frequency identification (RFID), near field communication (NFC).

For example, the technology may be of the low RFID type operating at a low frequency (a frequency of a few hundred kHz) or high frequency (from a few tens to a few hundreds of MHz) or ultra high frequency (with a frequency from several hundred MHz to several GHz).

As an alternative, other technologies may be considered, for example Bluetooth. For preference though, at least one of the electronic communications members 8, 10 of the first and second assemblies is configured to have a wireless communications range of between 5 millimeters and 40 centimeters and preferably between 1 centimeter and 10 centimeters.

This limited range allows perfect communication between the two assemblies 8, 10 when the two valves 3, 5 are connected but limits interference with potential other gas supply devices of the same type lying nearby.

Communication is assured, however, whatever the angular position of the second valve 5 on the first valve.

For example, the electronic communications members 8, 10 may each comprise at least one of the following: a passive transponder with no device for generating electromagnetic waves, an active transponder comprising a device for generating electromagnetic waves, the transponder comprising an electronic read-only or read and (re)write memory, with or without a battery, an active transponder comprising a device generating electromagnetic waves, an electronic read-only or read and (re)write memory, with or without a battery.

In the example of FIGS. 1 and 2, the communications member 8 of the first assembly is arranged on or around the first valve 3. For example, this communications member 8 may be incorporated into a flexible or rigid collar, preferably made of plastic. For example, the collar 8 is fixed to the top of the cylinder 2, for example between the first valve 3 and the cylinder 2. Likewise, the communications member 10 of the second assembly may be incorporated into or fixed to the second valve 5. For example, the communications member 10 may be incorporated into a collar arranged at the base of the second valve 5, for example concentric with the attachment members of the second valve 5.

As illustrated in FIGS. 1 and 2, the first assembly may comprise a protective bonnet 11 protecting the first valve 3. The bonnet 11 is for example fixed rigidly to the cylinder 2. The bonnet 11 forms a protective wall around at least part of the first valve 3. The bonnet 11 may be perforated and where appropriate comprise a region for grasping for handling the first assembly. In the example illustrated, the bonnet 11 comprises a top opening allowing the second valve 5 to be connected vertically to the top end of the first valve 3.

As illustrated in FIGS. 1 and 2, the device may comprise a detection element 17 detecting the connected or disconnected position of the second valve 5 with respect to the first valve. This detection element may consist of or comprise one or both communications members 8, 10 described hereinabove. What that means is that the connected or disconnected status may be detected according to the status of the wireless communications link between the electronic reading member 8 of the first assembly and the electronics member 10 of the second assembly. Thus, depending on the presence and/or nature and/or strength of the signals exchanged between the communications members 8, 10 it is possible to determine unambiguously whether or not the second valve 5 is connected to the first valve 3.

Of course, alternatively or in combination, the member 17 for detecting the connected or disconnected position may comprise any other system, notably a switch, an optical and/or magnetic and/or mechanical sensor, etc.

As illustrated in FIGS. 1 and 2, the device preferably comprises electronics data acquisition and processing logic 12 and an antenna 14 for emitting data in the form of electromagnetic (radiofrequency) radio waves or the like. For preference, all or some of these elements are incorporated into or attached to the second valve 5.

Alternatively or in combination, the communications member 10 of the second assembly and/or the antenna 14 is configured to communicate (both ways with any external communications member, notably a Smartphone, a communications gateway, etc.).

For preference, the data transmission member 14 (antenna or the like) is configured to communicate data wirelessly according to any type of appropriate communications protocol.

What this means to say is that the first 3 and second 5 assemblies exchange data wirelessly via their communications members 8, 10 and at least one of these communications members 8, 10 is additionally configured to be able to exchange data wirelessly (or via a wired connection) with a distinct remote device.

The logic electronics 12 are preferably connected to or incorporated into the electronic communications member 10 of the second assembly and configured to receive data coming from the electronic reading and communications member 10 of the second assembly and to transmit these data remotely, for example to a communications relay and/or to a central data processing platform.

What this means to say is that the logic electronics 12 may command the remote transmission of the information exchanged between the first and second assembly or just the information collected by the second assembly. For preference, this antenna 14 allows information to be received from outside the device so that it can be transmitted (stored/modified) in the communications member 8 of the first assembly and/or in the logic electronics 12 as appropriate.

The electronic communications member 8 of the first assembly may be configured to store at least one dynamic information item (a variable such as the magnitude of a pressure, a current date, etc.) and/or one static item of information (such as a numerical identifier of the cylinder and/or of the first valve 3).

For example, the electronic communications member 8 of the first assembly may be configured to store at least one of the following pieces of information: an identification of the cylinder 2, information relating to the nature of the fluid contained in the cylinder 2, information relating to the maximum capacity of the cylinder, information relating to the amount of fluid contained in the cylinder 2, information identifying the owner or user of the cylinder 2, information relating to the site at which the cylinder 2 is used, information relating to the expiry date of the fluid contained in the cylinder 2, information relating to certification of the fluid contained in the cylinder 2, a date on which the cylinder is to be retested, a history of at least one of the previous pieces of information etc.

Thus, for example, the electronic data acquisition and processing member 12 may be configured to detect a connected or disconnected status of the second valve 5 with respect to the first valve 3 according to whether the electronic communications member 10 of the second assembly receives or, respectively, does not receive, data from the electronic member 10 which are emitted by the communications member 8 of the first assembly.

The electronic data acquisition and processing member 12 may also be configured to verify the technical or functional compatibility between the first valve 3 and second valve 5 (for example by comparing pre-established tables).

The electronic data acquisition and processing member 12 may be configured, in the event of detection of the transition from a disconnected state to a connected state of the second valve 5 with respect to the first valve 3, to emit and/or display information relating to the connected/disconnected status of the second valve 5 with respect to the first valve 3. For that purpose, the device 1 may comprise a screen on which to display contextual information.

Likewise, the electronic data acquisition and processing member 12 may be configured, in the event in particular of detection of the transition from a connected state to a disconnected state of the second valve 5 with respect to the first valve 3, to emit and/or display information relating to the connected/disconnected status of the second valve 5 with respect to the first valve 3.

Likewise, the electronic data acquisition and processing member 12 may be configured, in the event of detection of the transition from a disconnected state to a connected state of the second valve 5 with respect to the first valve 3 (or vice versa) to command at least one of the following: to command the displaying or transmission of information relating to the gas supply device, to start/stop the execution of a control program controlling at least one functional member of the gas supply device (measuring pressure, calculating autonomy, displaying for the benefit of the user information regarding gas autonomy, information regarding the flow rate of gas consumed, an alarm, etc.).

Figure 3:
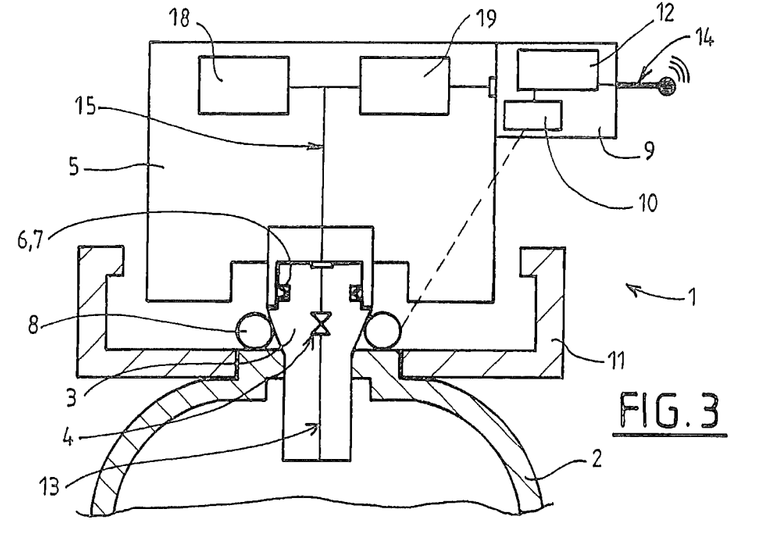
FIGS. 3 to 5 depict schematic and partial cross-sectional views respectively illustrating three other embodiments of a fluid supply device in a connected state.
Figure 4:
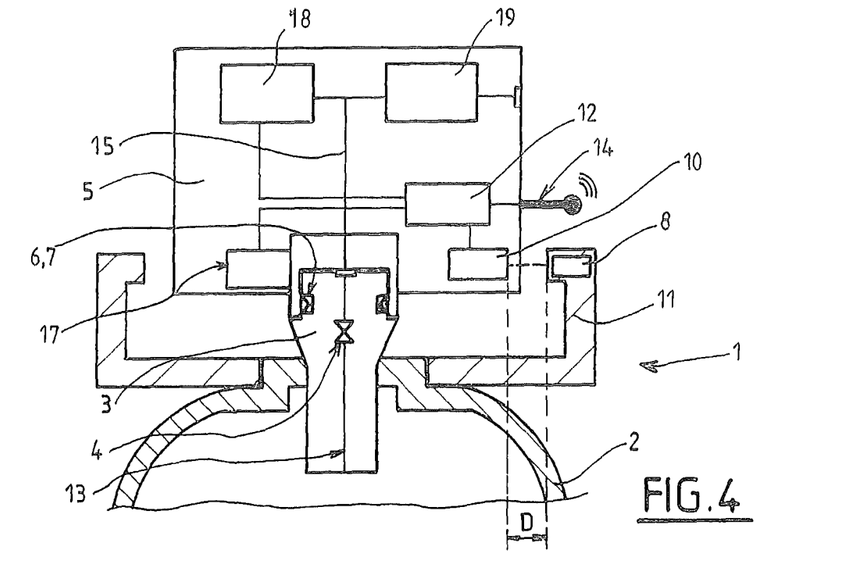
Figure 5:
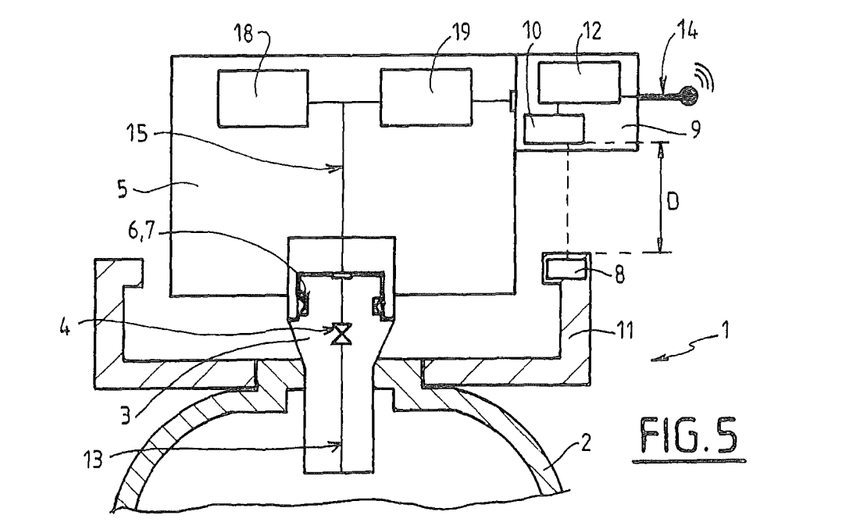

FIGS. 3 to 5 illustrate alternative forms of embodiment in which elements identical to those described hereinabove are denoted by the same numerical references and are not described again.

In the alternative form of FIG. 3, the communications member 10 of the second assembly is not incorporated into the second valve 5 but is incorporated into a communications module 9 distinct from the second valve 5 and which is fixed removably (quick connection) to the second valve 5. As illustrated in FIG. 3, this module 9 may also incorporate all or some of the logic electronics and/or the antenna 14.

In the alternative form of FIG. 4, the communications member 8 of the first assembly is incorporated into the bonnet 11, ideally manufactured from metal or plastic. In addition, as illustrated, the communications member 8 of the first is incorporated into the bonnet at a location preferably adjacent to the portion of the bonnet 11 that comprises the communications member 8.

In the alternative form of FIG. 5, the communications member 8 of the first assembly is incorporated into the bonnet 11 whereas the communications member 10 of the second assembly is incorporated into a communications module 9 distinct from the second valve 5 and which is fixed removably (quick connection) on the second valve 5.

The device described hereinabove thus makes it possible to manage the modular elements of one or more gas transfer devices. In particular, the device makes it possible to manage exchanges between one or more first assemblies (including one cylinder) and one or more second valves 5 that are selectively connectable.

The device allows automatic recognition of the cylinder 2 by the second valve 5 (and vice versa) in order if appropriate to ensure traceability and/or compatibility between connections and uses.

This allows better management of a holding of cylinders and of associated valves. This can be used in particular to offer services such as stock control assistance, automatic control of hardware, gas, and the making-available of safety data, etc.

If the first 3 and/or the second 5 valve is equipped with a pressure sensor that measures the pressure in the cylinder 2, this information may be transmitted and/or displayed and/or used to calculate autonomy, gas consumption, via processing electronics (for example the data processing logic electronics 12 comprising at least one microprocessor or any other suitable system) in order to generate an alert (for example to signal that the cylinder is almost empty).

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. A device for supplying pressurized fluid, comprising a first functional assembly comprising a cylinder of pressurized fluid equipped with an orifice in which a first valve is fixed, the cylinder comprising a protective bonnet protecting the first valve and rigidly fixed to the cylinder the first valve comprising an internal fluid circuit comprising an isolation shutter, the device comprising a second valve forming a separate physical entity from the first valve, the second valve being equipped with an internal fluid circuit, the second valve comprising a mobile actuating member for actuating the isolation shutter of the first valve so as to cause the latter to open or to close, the first valve and the second valve comprising respective attachment members forming a male/female quick-connection system for removably connecting the second valve to the first valve, when the second valve is in the position in which it is connected to the first valve, the second valve being partially housed in the bonnet, wherein the first assembly comprises at least one electronic data storage and communications member that can be interrogated remotely and wirelessly using electromagnetic waves, and in that the second valve comprises at least one electronic data reading and communications member for reading, remotely, wirelessly and using electromagnetic waves, the data of the electronic member of the first assembly, the at least one electronic communications member of the first assembly being secured to the bonnet, or is arranged on or around the first valve or is fixed to the cylinder, the second valve, comprising a remote data transmission member comprising data acquisition and processing logic electronics and a data emission antenna for emitting data in the form of electromagnetic radio waves, said logic electronics being connected to or incorporated into the electronic reading and communications member of the second valve and configured to receive data coming from the electronic reading and communications member and to transmit these data remotely.

2. The device of claim 1, wherein the electronic communications members of the first and second assemblies use wireless communications technology of the same kind having a determined maximum range, said maximum range being greater than or equal to the distance separating said members when the second valve is in the connected position on the first valve.

3. The device of claim 1, wherein the electronic communications members of the first and second assemblies are configured to communicate wirelessly using at least one of the following technologies: radio frequency identification (RFID), near field communication (NFC).

4. The device of claim 1, wherein at least one of the electronic communications members of the first assembly and of the second valve is configured to have a wireless communications range of between 1 and 5 millimeters and 40 centimeters.

5. The device of claim 1, wherein the electronic communications member of the first assembly is housed at the upper end of the bonnet when the bonnet is in a vertical position of use.

6. The device of claim 5, wherein the bonnet comprises a wall forming a chamber around the first valve, the chamber delimiting an opening toward the top when the bonnet is in the vertical position of use, the electronic communications member of the first assembly being housed at the upper end of the wall forming a chamber around the first valve.

7. The device of claim 1, wherein the at least one electronic communications member of the second valve is incorporated into or fixed to the second valve.

8. The device of claim 1, wherein said at least one electronic communications member of the second valve is incorporated into a functional member physically separate from the second valve and fixed removably to the second valve via the quick-connection system.

9. The device of claim 1, wherein the at least one electronic communications member of the first assembly comprises at least one of the following: a passive transponder with no device for generating electromagnetic waves, an active transponder comprising a device for generating electromagnetic waves, the transponder comprising an electronic read-only memory or an electronic read and (re)write memory, with or without a battery, and in that said at least one reading member of the second valve comprises at least one of the following: a passive transponder with no device for generating electromagnetic waves, an active transponder comprising a device for generating electromagnetic waves, the transponder comprising an electronic read-only memory or an electronic read and (re)write memory, with or without a battery.

10. The device of claim 1, wherein the remote transmission member is incorporated into the second valve or into a distinct module connected removably to said second valve.

11. The device of claim 1, wherein the at least one electronic communications member of the first assembly is configured to store at least one of the following pieces of information: an identification of the cylinder, information relating to the nature of the fluid contained in the cylinder, information relating to the maximum capacity of the cylinder, information relating to the amount of fluid contained in the cylinder, information identifying the owner or user of the cylinder, information relating to the site at which the cylinder is used, information relating to the expiry date of the fluid contained in the cylinder, information relating to certification of the fluid contained in the cylinder, a history of at least one of the previous pieces of information.

12. The device of claim 1, wherein out of: the first assembly and the second valve, at least one comprises an electronic data acquisition and processing member, said electronic data acquisition and processing member being connected wirelessly or through a wired connection to the electronic communications member of the first assembly or to the communications member of the second valve, the electronic data acquisition and processing member being configured to detect a connected or disconnected status of the second valve with respect to the first valve according to the status of the wireless communications connection between the electronic communications member of the first assembly and the electronic communications member of the second assembly.

13. The device of claim 12, wherein the electronic data acquisition and processing member is configured to detect a connected or disconnected status of the second valve with respect to the first valve according to whether the electronic communications member of the second assembly receives or, respectively, does not receive, data from the electronic member which have been emitted by the electronic communications member of the first assembly via a signal of determined signal strength.

14. A method for identifying a first functional assembly of a device for supplying pressurized fluid according claim 1, the method comprising a first step of connecting a second valve of a second functional assembly to the first valve of the first functional assembly, a step of wirelessly reading at least one piece of data contained in the electronic communications member of the first by the electronic communications member of the second assembly.

15. The method of claim 14, further comprising at least one of the following: a step of memory storage of said information read in the electronic reading member, a step of remotely transmitting said information read.

* * * * *